United States Patent [19]

Masson et al.

[11] Patent Number: 5,243,607
[45] Date of Patent: Sep. 7, 1993

[54] METHOD AND APPARATUS FOR FAULT TOLERANCE

[75] Inventors: Gerald M. Masson; Gregory F. Sullivan, both of Baltimore, Md.

[73] Assignee: The Johns Hopkins University, Baltimore, Md.

[21] Appl. No.: 543,451

[22] Filed: Jun. 25, 1990

[51] Int. Cl.$^5$ ............................................. H04L 1/08
[52] U.S. Cl. .................... 371/69.1; 371/68.3; 371/68.1; 371/19; 395/575
[58] Field of Search ............ 371/69.1, 68.3, 68.1, 371/19, 15.1, 16.1, 67.1; 364/200 MS File; 395/575

[56] References Cited

U.S. PATENT DOCUMENTS

| | | | |
|---|---|---|---|
| 4,696,003 | 9/1987 | Kerr | 371/69.1 X |
| 4,756,005 | 7/1988 | Shedd | 371/69.1 X |
| 5,005,174 | 4/1991 | Bruckert et al. | 371/68.3 |

OTHER PUBLICATIONS

H. Geng, "Circuit for the Complete Check of a Data-Processing System", IBM TDB, vol. 16, No. 4, Sep. 1974, pp. 1144-1145.

K. Knowlton, "A Combination Hardware-Software Debugging System," IEEE Transactions on Computers, Jan. 1968, pp. 81-86.

*Primary Examiner*—Robert W. Beausoliel, Jr.
*Assistant Examiner*—Ly V. Hua
*Attorney, Agent, or Firm*—Ansel M. Schwartz

[57] ABSTRACT

A method and apparatus for achieving fault tolerance in a computer system having at least a first central processing unit and a second central processing unit. The method comprises the steps of first executing a first algorithm in the first central processing unit on input which produces a first output as well as a certification trail. Next, executing a second algorithm in the second central processing unit on the input and on at least a portion of the certification trail which produces a second output. The second algorithm has a faster execution time than the first algorithm for a given input. Then, comparing the first and second outputs such that an error result is produced if the first and second outputs are not the same. The step of executing a first algorithm and the step of executing a second algorithm preferably takes place over essentially the same time period.

18 Claims, 6 Drawing Sheets

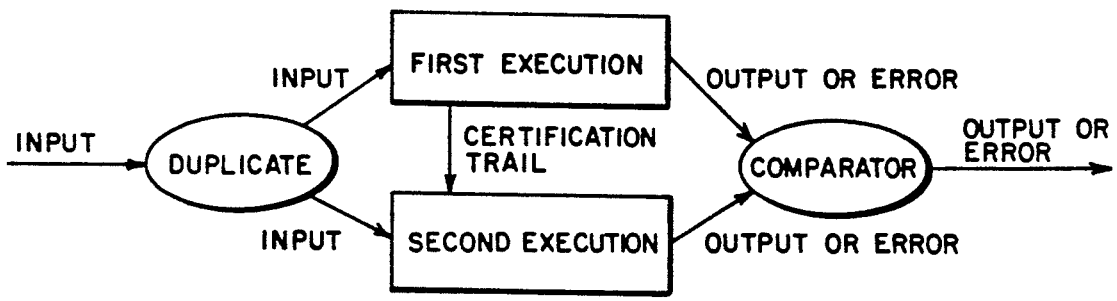

FIG. 1

```
Algorithm MINSPAN(G,weight)
Input: Connected graph G = (V,E) where V = {1,...,n} with edge weights.
Output: Spanning tree of G which has minimum weight
1  CHOOSE root ∈ V
2  FOR ALL u ∈ V, key(u) := ∞ END FOR
3  h:=0; v:= root
4  WHILE v ≠ empty DO
5    key(v) := —∞
6    FOR EACH [v,w] ∈ E DO
7      IF weight([v,w]) < key(w) THEN
8        key(w) := weight([v,w]); prefer(w) := [v,w]
9        IF member(w,h) THEN changekey(w,key(w),h)
10       ELSE insert(w,key(w),h) END IF
11     END IF
12   END FOR
13   (v,k) := deletemin(h)
14 END WHILE
15 FOR ALL u ∈ V - {root}, OUTPUT(prefer(u)) END FOR
END MINSPAN
```

FIG. 3

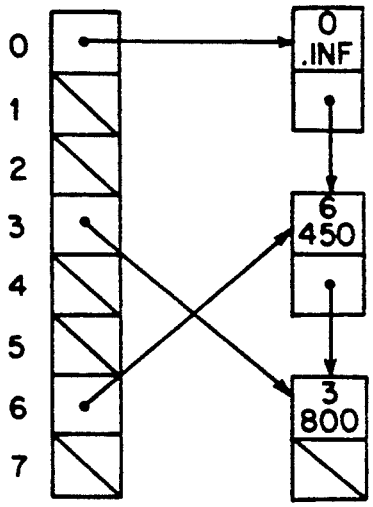

FIG. 4(a)

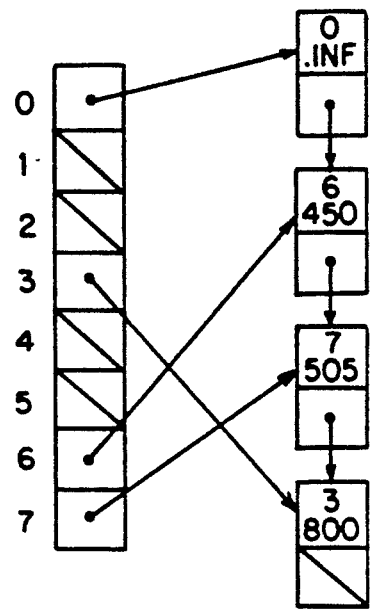

FIG. 4(b)

```
Algorithm HUFFMAN (FREQ)
Input: Sequence of positive integers FREQ.={f[1],f[2],...,f[n]}
Output: Pointer to a Huffman tree for the input frequencies
1  FOR i:=1 to n DO
2      insert (i,f[i],h)
3      ptr [i]:= allocate()
4      info[ptr[i]]:=(i,f[i])
5  END FOR
6  FOR j:=n+1 to 2n-1 DO
7      (item1, key1):= deletemin(h)
8      (item2, key2):= deletemin(h)
9      ptr [j]:= allocate()
10     info[ptr[j]]:=(j,key1+key2)
11     left [ptr[j]]:= ptr [item1]
12     right[ptr[j]]:= ptr [item2]
13     insert (j,key1+key2,h)
14 END FOR
15 OUTPUT (ptr [2n-1])
END HUFFMAN
```

FIG. 5

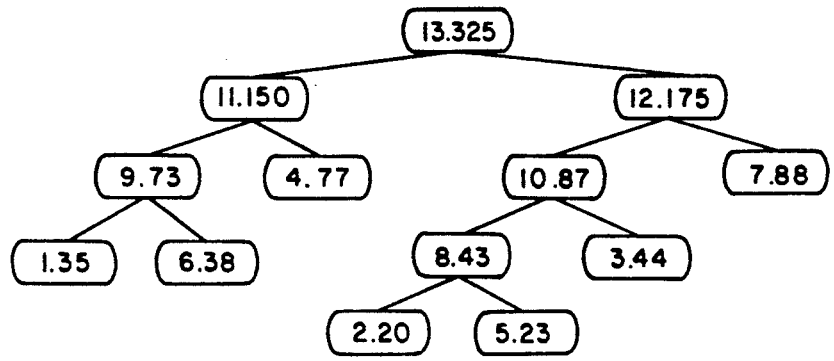

FIG. 6

```
Algorithm CONVEXHULL(S)
Input: Set of points, S, in R²
Output: Counterclockwise sequence of points in R² which define convex hull of S
1  Let p1 be the point with the largest x coordinate (and smallest y to break ties)
2  For each point p (except p1) calculate the slope of the line through p1 and p
3  Sort the points (except p1) from the smallest slope to the largest. Call them p2,...,pn
4  q1:= p1; q2:=p2; q3:=p3; m=3
5  FOR k = 4 to n DO
6     WHILE the angle formed by qm-1,qm,pk is ≥ 180 degrees DO m := m-1 END FOR
7     m := m+1
8     qm := pk
9  END FOR
10 FOR i = 1 to m DO, OUTPUT(qi) END FOR
END CONVEXHULL
```

FIG. 7

METHOD AND APPARATUS FOR FAULT TOLERANCE

LICENSES

The United States Government has a paid-up non-exclusive license to practice the claimed invention herein as per NSF Grant CCR-8910569 and NASA Grant NSG 1442.

FIELD OF THE INVENTION

The present invention relates to fault tolerance. More specifically, the present invention relates to a first algorithm that provides a certification trail to a second algorithm for fault tolerance purposes.

BACKGROUND OF THE INVENTION

Traditionally, with respect to fault tolerance, the specification of a problem is given and an algorithm to solve it is constructed. This algorithm is executed on an input and the output is stored. Next, the same algorithm is executed again on the same input and the output is compared to the earlier output. If the outputs differ then an error is indicated, otherwise the output is accepted as correct. This software fault tolerance method requires additional time, so called time redundancy [Johnson, B., Design and analysis of fault tolerant digital systems, Addison-Wesley, Reading Mass., 1989; Siewiorek, D., and Swarz, R., The theory and practice of reliable design, Digital Press, Bedford, Mass., 1982]; however, it requires not additional software. It is particularly valuable for detecting errors caused by transient fault phenomena. If such faults cause an error during only one of the executions then either the error will be detected or the output will be correct.

A variation of the above method uses two separate algorithms, one for each execution, which have been written independently based on the problem specification. This technique, call N-version programming [Chen, L., and Avizienis A., "N-version programming: a fault tolerant approach to reliability of software operation," Digest of the 1978 Fault Tolerant Computing Symposium, pp. 3-9, IEEE Computer Society Press, 1978; Avizienis, A., "The N-version approach to fault tolerant software," IEEE Trans. on Software Engineering, vol. 11, pp. 1491-1501, December, 1985] (in this case N=2), allows for the detection of errors caused by some faults in the software in addition to those caused by transient hardware faults and utilizes both time and software redundancy. Errors caused by software faults are detected whenever the independently written programs do not generate coincident errors.

SUMMARY OF THE INVENTION

The present invention pertains to a method for achieving fault tolerance in a computer system having at least a first central processing system and a second central processing system. The method comprises the steps of first executing a first algorithm in the first central processing unit on input which produces a first output as well as a certification trail. Next, executing a second algorithm in the second central processing unit on the input and on at least a portion of the certification trail which produces a second output. The second algorithm has a faster execution time than the first algorithm for a given input. Then, comparing the first and second outputs such that an error result is produced if the first and second outputs are not the same. The step of executing a first algorithm and the step of executing a second algorithm preferably takes place over essentially the same time period.

The present invention also pertains to a method for achieving fault tolerance in a central processing unit. The method comprises the steps of executing a first algorithm in the central processing unit on input which produces the first output as well as a certification trail. Then, there is the step of executing a second algorithm in the central processing unit on the input and on at least a portion of the certification trail which produces a second output. The second algorithm has a faster execution time than the first algorithm for a given input. Then, there is the step of comparing the first and second outputs such that an error result is produced if the first and second outputs are not the same.

The present invention also pertains to a computer system. The computer system comprises a first computer. The first computer has a first memory. The first computer also has a first central processing unit in communication with the memory. The first computer additionally has a first input port in communication with the memory in the first central processing unit. There is a first algorithm disposed in the first memory which produces a first output as well as a certification trail based on input received by the input port when it is executed by the first central processor. The computer system is additionally comprised of a second computer. The second computer is comprised of a second memory. The second computer is also comprised of a second central processing unit in communication with the memory and the first central processing unit. The second computer additionally is comprised of a second input port in communication with the memory in the second central processing unit. There is a second algorithm disposed in the second memory which produces a second output based on the input and on at least a portion of the certification trail when the second algorithm is executed by the second central processing unit. The second algorithm has a faster execution time than the first algorithm for a given input. The computer system is also comprised of a mechanism for comparing the first and second outputs such that an error result is produced if the first and second outputs are not the same.

Moreover, the present invention also pertains to a computer. The computer is comprised of a memory. Additionally, the computer is comprised of a central processing unit in communication with the memory. The computer is additionally comprised of a first input port in communication with the memory and the central processing unit. There is a first algorithm disposed in the memory which produces a first output as well as a certification trail based on input received by the input port when the input is executed by the first central processor. There is a second algorithm also disposed in the memory which produces a second output based on the input and on at least a portion of the certification trail when the second algorithm is executed by the central processing unit. The second algorithm has a faster execution time than the first algorithm for a given input. Moreover, the computer is comprised of a mechanism for comparing the first and second outputs such that an error result is produced if the first and second outputs are not the same.

BRIEF DESCRIPTION OF THE DRAWINGS

In the accompanying drawings, the preferred embodiments of the invention and preferred methods of practicing the invention are illustrated in which:

FIG. 1 is a block diagram of the present invention.

FIG. 3 with the source code for a mince man algorithm.

FIG. 4A and 4B shows an example of a data structure used in the second execution of a mince man algorithm.

FIG. 5 with the source code for a Huffman algorithm.

FIG. 6 shows an example of a Huffman tree.

FIG. 7 with the source code for Graham's scan algorithm.

DESCRIPTION OF THE PREFERRED EMBODIMENT

Figure 2A:
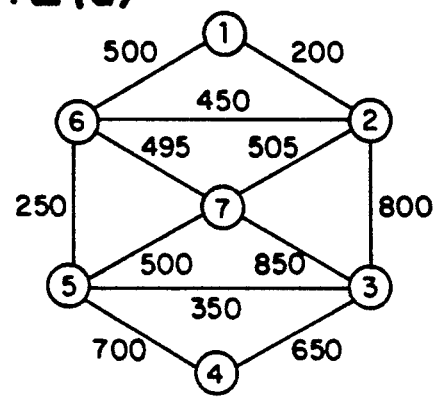
FIGS. 2A through FIG. 2F shows an examples of a minimum spanning tree algorithm.
Figure 2B:
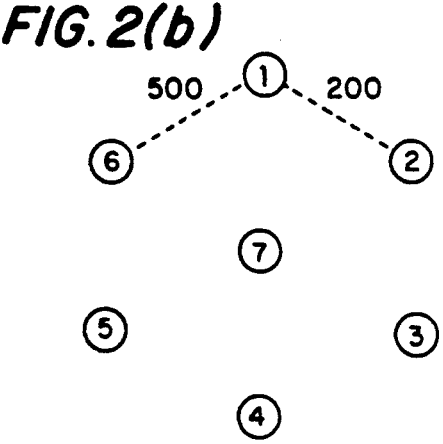
Figure 2C:
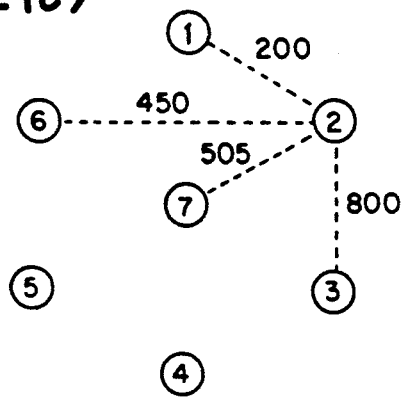
Figure 2D:
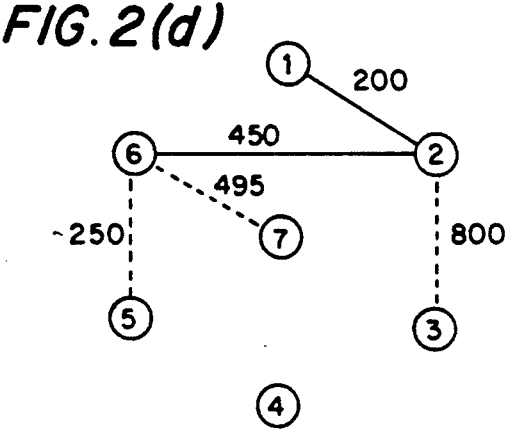
Figure 2E:
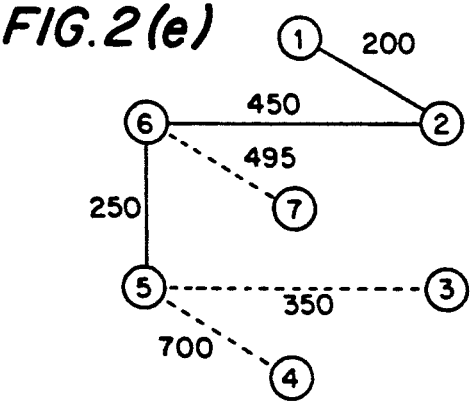

The central idea of the present invention, essentially a fault tolerance mechanism, as illustrated in FIG. 1, is to modify a first algorithm so that it leaves behind a trail of data which is called a certification trail. This data is chosen so that it can allow a second algorithm to execute more quickly and/or have a simpler structure than the first algorithm. The outputs of the two executions are compared and are considered correct only if they agree. Note, however, care must be taken in defining this method or else its error detection capability might be reduced by the introduction of data dependent between the two algorithm executions. For example, suppose the first algorithm execution contains a error which causes an incorrect output and an incorrect trial of data to be generated. Further suppose that no error occurs during the execution of the second algorithm. It still appears possible that the execution of the second algorithm might use the incorrect trail to generate an incorrect output which matches the incorrect output given by the execution of the first algorithm. Intuitively, the second execution would be "fooled" by the data left behind by the first execution. The definitions given below exclude this possibility. They demand that the second execution either generates a correct answer or signals the fact that an error has been detected in the data trail. Finally, it should be noted that in FIG. 1 both executions can signal an error. These errors would include run-time errors such as divided-by-zero or non-terminating computation. In addition the second execution can signal error due to an incorrect certification trail. The fault tolerance means can be used in hardware or software systems and manifested as firmware or software in a central processing unit.

A formal definition of a certification trail is the following.

Definition 2.1. A problem P is formalized as a relation (that is, a set of ordered pairs). Let D be the domain (that is, the set of inputs) of the relation P and let S be the range (that is, the set of solutions) for the problem. It can be said an algorithm A solves a problem P if for all $d \in D$ when d is input to A then an $s \in S$ is output such that $(d,s) \in P$.

Definition 2.2. Let P : D - S be a problem. Let T be the set of certification trails. A solution to this problem using a certification trail consists of two functions $F_1$ and $F_2$ with the following domains and ranges $F_1:D \rightarrow S \times T$ and $F_2:D \times T \rightarrow S \cup$ error. The functions must satisfy the following two properties:

(1) for all $d \in D$ there exists $s \in S$ and there exists $t \in T$ such that $F_1(d) = (s,t)$ and $F_2(d,t) = s$ and $(d,s) \in P$ (2) for all $d \in D$ and for all $t \in T$ either ($F_2(d,t) = s$ and $(d,s) \in P$) or $F_2(d,t) =$ error.

The definitions above assure that the error detection capability of the certification trail approach is comparable to that obtained with the simple time redundancy approach discussed earlier. That is, if transient hardware faults occur during only one of the executions then either an error will be detected or the output will be correct. It should be further noted, however, the examples to be considered will indicate that this new approach can also save overall execution time.

The certification trial approach also allows for the detection of faults in software. As in N-version programming, separate teams can write the specification now must include precise information describing the generation and use of the certification trial. Because of the additional data available to the second execution, the specifications of the two phases can be very different; similarly, the two algorithms used to implement the phases can be very different. This will be illustrated in the convex hull example to be considered later. Alternatively, the two algorithms can be very similar, differing only in data structure manipulations. This will be illustrated in the minimum spanning tree and Huffman tree examples to be considered later. When significantly different algorithms are used it is sometimes possible to save programming effort by sharing program code. While this reduces the ability to detect errors in the software it does not change the ability to detect transient hardware errors as discussed earlier.

With respect to the above, it has been assumed that our method is implemented with software; however, it is clearly possible to implement the certification trail technique by using dedicated hardware. It is also possible to generalize the basic two-level hierarchy of the certification trial approach as illustrated in FIG. 1 to higher levels.

Examples of the Certification Trail Technique

In this section, there is illustrated the use of certification trails by means of applications to three well-known and significant problems in computer science: the minimum spanning tree problem, the Huffman tree problem, and the convex hull problem. It should be stressed here that the certification trail approach is not limited to these problems. Rather, these algorithms have been selected only to give illustrations of this technique.

Minimum Spanning Tree Example

The minimum spanning tree problem has been examined extensively in the literature and an historical survey is given in [Graham, R.L., "An efficient algorithm for determining the convex hull of a planar set", Information Processing Letters, pp. 132-133, 1, 1972]. The certification trial approach is applied to a variant of the Prim/Dijkstra algorithm ]Prim, R.C., "Shortest connection networks and some generalizations,: Bell Syst. Tech. J., pp. 1389-1401, November, 1957; Dijkstra, E.

W., "A note on two problems in connexion with graphs," Numer. Math. 1, pp. 269–1984, Jun. 20–22] as explicated in [Tarjan, R.E., Data Structures and Network Algorithms, Society for Industrial and applied Mathematics, Philadelphia, Pa. 1983]. The discussion of the application of the certification trail approach to the minimum spanning tree problem beings with some preliminary definitions.

Definition 3.1. A graph $G = (V,E)$ consists of a vertex set V and an edge set E. An edge is an unordered pair of distinct vertices which is notated as, for example, [v,w], and it is said v is adjacent to w. A path in a graph from $v_1$ to $v_k$ is a sequence of vertices $v_1, v_2, \ldots, v_k$ such that $[v_1, v_{1}=_1]$ is an edge for $i \in [1, \ldots, k-1]$. A path is a cycle if $k > 1$ and $v_1 = v_k$. An acyclic graph is a graph which contains no cycles. A connected graph is a graph such that for all pairs of vertices v,w there is a path from v to w. A tree is an acyclic and connected graph.

Definition 3.2. Let $G = (V,E)$ be a graph and let w be a positive rational valued function defined on E. A subtree of G is a tree, $T(V',E')$, with $V' \subseteq V$ and $E' \subseteq E$. It is said T spans $V'$ and $V'$ is spanned by T. If $V' = V$ then we say T is a spanning tree of G. The weight of this tree is $\Sigma_{e \in E} w(e)$. A minimum spanning tree is a spanning tree of minimum weight.

Data Structures and Supported Operations

Before discussion of the minimum spanning tree algorithm, there must be described the properties of the principle data structure that are required. Since many different data structures can be used to implement the algorithm, initially there is described abstractly the data that can be stored by the data structure and the operations that can be used to manipulate this data. The data consists of set of ordered pairs. The first element in these ordered pairs is referred to as the item number and the second element is called the key value. Ordered pairs may be added and removed from the set; however, at all times, the item numbers of distinct ordered pairs must be distinct. It is possible, through, for multiple ordered pairs to have the same key value. In this paper the item numbers are integers between 1 and n, inclusive. Our default convention is that i is an item number, k is a key value and h is a set of ordered pairs. A total ordering on the pairs of a set can be defined lexicographically as follows: $(i,k) < (i',k')$ iff $k < k'$ or $(k = k'$ and $i < i')$. The data structure should support a subset of the following operations.

member (i,h) returns a boolean value of true if h contains an ordered pair with item number i, otherwise returns false.

insert (i,k,h) adds the ordered pair (i,k) to the set h.

delete (i,h) deletes the unique ordered pair with item number i from h.

changekey (i,k,h) is executed only when there is an ordered pair with item number i and h. This pair is replaced by (i,k).

deletemin (h) returns the ordered pair which is smallest according to the total order defined above and deletes this pair. If h is the empty set then the token "empty" is returned.

predecessor (i,h) returns the item number of the ordered pair which immediately precedes the pair with item number i in the total order. If there is no predecessor then the token "smallest" is returned.

Many different types and combinations of data structures can be used to support these operations efficiently. In our case, there is used two different data structure methods to support these operations. One method will be used in the first execution of the algorithm and another, faster and simpler, method will be used in the second execution. The second method relies on a trail of data which is output by the first execution.

MINSPAN ALGORITHM

Before discussing precise implementation details for these methods the overall algorithm used in both executions is presented. Pidgin code for this algorithm appears below. In addition, FIG. 2 illustrates the execution of the algorithm on a sample graph and the table below records the data structure operations the algorithm must perform when run on the sample graph. The fist column of the table gives the operations except member and the parameter h dropped to reduce clutter. The second column gives the evolving contents of h. The third column records the ordered pair deleted by the deletemin operation. The fourth column records to certification trail corresponding to these operations and is further discussed below.

Figure 2F:
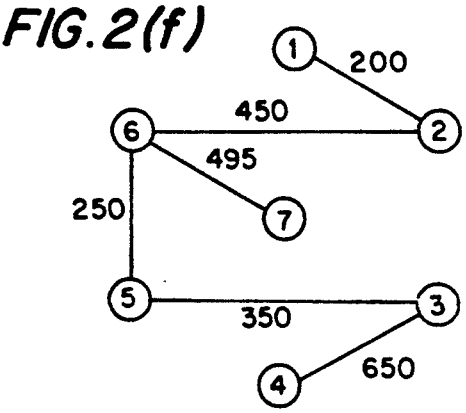

The algorithm uses a "greedy" method to "grow" a minimum spanning tree. The algorithm starts by choosing an arbitrary vertex from which to grow the tree. During each iteration of the algorithm a new edge is added to the tree being constructed. Thus, the set of vertices spanned by the tree increases by exactly one vertex for each iteration. The edge which is added to the tree is the one with the smallest weight. FIG. 2 shows this process in action. FIG. 2(a) shows the input graph, FIGS. 2(b) through 2(e) show several stages of the tree growth and FIG. 2(f) shows the final output of the minimum spanning tree. The solid edges in FIGS. 2(b) through 2(e) represent the current tree and the dotted edges represent candidates for addition to the tree.

To efficiently find the edge to add to the current tree the algorithm uses the data structure operations described above. As soon as a vertex, say v, is adjacent to some vertex which is currently spanned it is inserted in the set h. The key value for v is the weight of the minimum edge between v and some vertex spanned by the current tree. The array element prefer (v) is used to keep track of this minimum weight edge. As the tree grows, information is updated by operations such as insert (i,k,h) and changekey (i,k,h).

TABLE 1

| Data structure operations and certification trail for MINSPAN | | | |
|---|---|---|---|
| Operation | Set of Ordered Pairs | Delete | Trail |
| insert(2,200) | (2,200) | | smallest |
| insert(6,500) | (2,200),(6,500) | | 2 |
| deletemin | (6,500) | (2,200) | |
| insert(3,800) | (6,500),(3,800) | | 6 |
| changekey(6,450) | (6,450),(3,800) | | smallest |
| insert(7,505) | (6,450),(7,505),(3,800) | | 6 |
| deletemin | (7,505),(3,800) | (6,450) | |
| insert(5,250) | (5,250),(7,505),(3,800) | | smallest |
| changekey(7,495) | (5,250),(7,495),(3,800) | | 5 |
| deletemin | (7,495),(3,800) | (5,250) | |
| changekey(3,350) | (3,350),(7,495) | | smallest |
| insert(4,700) | (3,350),(7,495),(4,700) | | 7 |
| deletemin | (7,495),(4,700) | (3,350) | |
| changekey(4,650) | (7,495),(4,650) | | 7 |
| deletemin | (4,650) | (7,495) | |
| deletemin | | (4,650) | |
| deletemin | | empty | |

The deletemin (h) operation is used to select the next vertex to add to the span of the current tree. Note, the algorithm does not explicitly keep a set of edges representing the current tree. Implicitly, however, if (v,k) is returned by deletemin then prefer (v) is added to the current tree.

In the first execution of the MINSPAN algorithm, the MINSPAN code is used and the principle data structure is implemented with a balanced tree such as an AVL tree [Adel'son-Vel'skii, G.M., and Landis, E.M., "An algorithm for the organization of information", Soviet Math. Dokl., pp. 1259-1262, 3, 1962], a red-black tree [Guibas, L.J., and Sedgewick, R., "A dichromatic Framework for balanced trees", Proceedings of the Nineteenth Annual Symposium on Foundations of Computing, pp. 8-21, IEEE Computer Society Press, 1978] or a b-tree [Bayer, R., and McCreight, E., "Organization of large ordered indexes", Acta Inform., pp 173-189, 1, 1972]. In addition, an array of pointers indexed from 1 to n is used. The balanced search tree stores the ordered pairs in h and is based on the total order described earlier. The array of pointers is initially all nil. For each item i, the ith pointer of the array is used to point to the location of the ordered pair with item number i in the balanced search tree. If there is no such ordered pair in the tree then the ith pointer is nil. This array allows rapid execution of operations such as member (i,h) and delete (i,h).

The certification trail is generated during the first execution as follows: When CHOOSE root $\epsilon$ V is executed in the first step, the vertex which is chosen is output. Also, each time insert (i,k,h) or changekey (i,k,h) are executed, predecessor (i,h) is executed afterwards, and the answer returned is output. This is illustrated in column labeled "Trail" in the table above.

The second execution of the MINSPAN algorithm also uses the MINSPAN code; however, the CHOOSE construct and the data structure operations are implemented differently than in the fist execution. The CHOOSE is performed by simply reading the first element of the certification trail. This guarantees the same choice of a starting vertex is made in both executions. FIG. 4 depicts the principal data structure used which is called an indexed linked list. The array is indexed from 1 to n and contains pointers to a singly linked list which represents the current contents of h from smallest to largest. The ith element of the array points to the node containing the ordered pair with the item number i if it is present in h; otherwise, the pointer is nil. The 0th element of the array points to the node containing (0, -INF). Initially, the array contains nil pointers except the 0th element. In order to implement the data structure operations, the following is provided.

To perform insert (i,k,h), it is necessary to read the next value in the certification trail. This value, say j, is the item number of the ordered pair which is the predecessor of (i,k) in the current contents of h. A new linked list node is allocated and the trail information is used to insert the node into the data structure. Specifically, the ith array pointer is traversed to a node in the linked list, say Y. (If j = "smallest" then the 0th array pointer is traversed.) The new node is inserted in the list just after node Y and before the next node in the linked list (if there is one). The data field in the new node is set to (i,k) and the ith pointer of the array is set to point to the new node. FIG. 4 shows the insertion of (7,505) into the data structure given that the certification trail value is 6.

FIG. 3(a) is before the insertion and FIG. 3(b) is after the insertion.

When the insert operation is performed, some checks must be conducted. First, the ith array pointer must be nil before the operation is performed. Section, the sorted order of the pairs stored in the linked list must be preserved after the operation. That is, if (i',k') is stored in the node before (i,k) in the linked list and (i'',k'') is stored after (i,k), then (i',k') < (i,k) < (i'', k'') must hold in the total order. If either of these checks fails then execution halts and "error" is output.

To perform delete (i,h) the ith array pointer is traversed and the node found is deleted from the linked list. Next, the ith array pointer is set to nil. FIG. 4 shows the deletion of item number 7 if one considers FIG. 3(a) as depicting the data structure before the operation and FIG. 3(b) depicting it afterwards. When the delete operation is performed one check is made. If the ith array pointer is nil before the operation then the execution halts and "error" is output.

To perform changekey (i,i,h) it suffices to perform delete (i,h) followed by insert (i,k,h). Note, this means the next item in the certification trail is read. Also, the checks associated with both these two operations are performed and the execution halts with "error" output if any check fails.

To perform detelemin (h) the 0th array pointer is traversed To the head of the list and the next node in the list is accessed. If there is no such node then "empty" is returned and the operation is complete. Otherwise, suppose the node is Y and suppose it contains the ordered pair (i,k), then the node Y is deleted from the list, the ith array pointer is set to nil, and (i,k) is returned.

Lastly, to perform member (i,h) the ith array pointer is examined. If it is nil then false is returned, otherwise, true is returned. The predecessor (i,h) operation is not used int he second execution.

This completes the description of the second execution. To show that there is described a correct implementation of the certification trail method requires a proof. The proof has several parts of varying difficulty. First, one must show that if the first execution is fault-free then it outputs a minimum spanning tree. Second, one must show that if the first and second executions are fault-free then they both output the same minimum spanning tree. Both these parts of the proof are not difficult to show.

The third more subtle part of the proof deals with the situation in which only the second execution is fault-free. This means an incorrect certification trail may be generated in the first execution. In this case, it must be shown that the second execution outputs either the correct minimum spanning tree or "error". The checks that were described this property by detecting any errors that would prevent the execution from generating the correct output.

In the first execution each data structure operation can be performed in O(log(n)) time where [V]=n. There are at most O(m) such operations and O(m) additional time overhead where [E]=m. Thus, the first execution can be performed in O(mlog(n)). It is noted that th is algorithm does not achieve the fastest known asymptotic time complexity which appears in Gabow, H.N., Galil, Z., Spencer, T., and Tarjan, R.E., "Efficient algorithms for finding minimum spanning trees in undirected and directed graphs," Combinatorica 6, pp. 109-122, 2, 1986. However, the algorithm presented here has a significantly smaller constant of proportionally which makes it competitive for reasonably sized graphs. In addition, it provides us with a relatively simple and illustrative example of the use of a certification trail.

In the second execution each data structure operation can be performed in O(1). There are still at most O(m) such operations and O(m) additional time overhead. Hence, the second execution can be performed in O(m) time. In other words, because of the availability of the certification trail, the second execution is performed in linear time. There are no known O(m) time algorithms for the minimum spanning tree problem. Komlos [26] was able to show that O(m) comparisons suffice to find the minimum spanning tree. However, there is no known O(m) time algorithm to actually find and perform these comparisons. Even the related "verification problem has no known linear time solution. In the verification problem the input consists of an edge weighted graph and a subtree. The output is "yes" if the subtree is the minimum spanning tree and "no" otherwise. The best known algorithm for this problem was created by Tarjan [Tarjan, R.E., "Applications of path compression on balanced trees", J. ACM, pp. 690–715, October, 1979] and has the nonlinear time complexity of O($m\alpha(m,n)$), where $\alpha(m,n)$ is a functional inverse of Ackerman's function. The fact that the data in a certification trail enables a minimum spanning tree to be found in linear time is, we believe, intriguing, significant, and indicative of the great promise of the certification trail technique.

Huffman Tree Example

Huffman trees represent another classic algorithmic problem, one of the original solutions being attributed to Huffman [Huffman, D., "A method for the construction of minimum redundancy codes", Proc. IRE, pp. 1098–1101, 40, 1952]. This solution has been used extensively to perform data compression through the design and use of so-called Huffman codes. These codes are prefix codes which are based on the Huffman tree and which yield excellent data compression ratios. The tree structure and the code design are based on the frequencies of individual characters in the data to be compressed. See Huffman, D., "A method for the construction of minimum redundancy codes", Proc. IRE, pp. 1098–1101, 40, 1952, for information about the coding application.

Definition 3.3. The Huffman tree problem is the following: Given a sequence of frequencies (positive integers) f[1], f[2], . . . , f[n], construct a tree with n leaves and with one frequency value assigned to each leaf so that the weighted path length is minimized. Specifically, the tree should minimize the following sum: $\Sigma_{l_i \in LEAF}$ len(i)f[i] where LEAF is the set of leaves, len(i) is the length of the path from the root of the tree to the leaf $l_i$, f[i] is the frequency assigned to the leaf $l_i$.

An example of a Huffman tree is given in FIG. 6. The input frequencies are: f(1) = 35, f(2) = 20, f(3) = 44, f(4) = 77, f(5) = 23, f(6) = 38, and f(7) = 88. The frequencies appear inside the leaf nodes as the second elements of the ordered pairs in the figure.

HUFFMAN ALGORITHM

The algorithm to construct the Huffman tree uses a data structure which is able to implement the insert and the deletemin operations which are defined above in the minimum spanning tree example. This type of data structure is often called a priority queue. The algorithm also uses the command allocate to construct the tree. This command allocates a new node and returns a pointer to it. Each node is able to store an item number and a key value in the field called info. the item numbers are in the set (1, . . . , 2n − 1) and the key values are sums of frequency values. The nodes also contain fields for left and right pointers since the tree being constructed is binary.

The Huffman tree is built from the bottom up and the overall structure of the algorithm is based on the greedy "merging" of subtrees. An array of pointers called ptr is used to point to the subtrees as they are constructed. Initially, n single vertex subtrees with the smallest associated frequency values. To perform a merge a new subtree is created by first allocating a new root node and next setting the left and right pointers to the two subtrees being merged. The frequency associated with the new subtree is the sum of the frequencies of the two subtrees being merged. In FIG. 6 the frequency associated with each subtree is shown as the second value in the root vertex of the subtree. Details of the algorithm are given below. Note that the priority queue data structure allows the algorithm to quickly determine which subtrees should be merged by enabling the two smallest frequency values to be found efficiently during each iteration.

Table 2 below illustrates the data structure operations performed when the Huffman tree in FIG. 6 is constructed. For conciseness the initial n inset operations have been omitted. The first column gives the set of ordered pairs in h. The second column gives the result of the two deletemin operations during each iteration. Note that this column is labeled "Trail" because it is also output as the certification trail. The third column records the elements which are inserted by the command on line 13.

TABLE 2

Data structure operations and certifications trial for HUFFMAN

| Set of Ordered Pairs | Trail | Insert |
|---|---|---|
| (2,20),(5,23),(1,35),(6,38),(3,44),(4,77),(7,88) | | |
| (1,35),(6,38),(8,43),(3,44),(4,77),(7,88) | (2,20),(5,23) | (8,43) |
| (8,43),(3,44),(9,73),(4,77),(7,88) | (1,35),(6,38) | (9,73) |
| (9,73),(4,77),(10,87),(7,88) | (8,43),(3,44) | (10,87) |
| (10,87),(7,88),(11,150) | (9,73),(4,77) | (11,150) |
| (11,150),(12,175) | (10,87),(7,88) | (12,175) |
| (13,325) | (11,150),(12,175) | (13,325) |

First Execution of HUFFMAN

In this execution the code entitled HUFFMAN is used and the priority queue data structure is implemented with a heap [Tarjan, R.E., Data Structures and Network Algorithms, Society for Industrial and Applied Mathematics, Philadelphia, Pa. 1983] or a balanced search tree [Guibas, L.J., and Sedgewick, R., "A dichromatic framework for balanced trees", Proceedings of the Nineteenth Annual Symposium on Foundations of Computing, pp. 8–21, IEEE computer Society Press, 1978; Adel'son-Vel-Vel'skii, G.M., and Landis, E.M., "An algorithm for the organization of information", Soviet Math. Dokl., pp. 1259–1262, 3, 1962; Bayer, R., and McCreight, E., "Organization of large ordered indexes", Acta Inform., pp. 173–189, 1, 1972]. Actually, any correct implementation is acceptable; however, to achieve a reasonable time complexity for this execution the suggested implementation are desirable. the certification trail is generated as follows: whenever deletemin (h) is executed the item number and the key value which are returned are both output. In the table, the certification trail is listed in the second column.

Second Execution of HUFFMAN

This execution consists of two parts which may be logically separated but which are performed together. In the first logical part, the code called HUFFMAN is executed again except that the data structure operations are treated differently. All insert operations are not performed and all deletemin operations are performed by simply reading the ordered pairs from the certification trail. In the second logical part, the data structure operations are "verified". Note, by "verify" it does not mean a formal proof of correctness based on the text of an algorithm. The problem of verification can be formulated as follows: given a sequence of insert (i,k,h) and deletemin (h) operations (h) operations check to see if the answers are correct. It should be noted that while in our example there is only one h, in general there can be multiple h's to be handled.

The description of the algorithm for the second execution can be further simplified because only some restricted types of operation sequences are generated by the HUFFMAN code. First, it can be observed that all elements are ultimately deleted from h before the algorithm terminates; second, it can be further observed that when an element is inserted into h, its key value is larger than the key value of the last element deleted from h. These two important observations allow us to check a sequence using the simplified method which is described next.

Our simplified method uses an array of integers indexed from 1 to 2n − 1. This array is used to track the contents of h. If the ordered pair (i,k) is in h, then array element i is set to a value of k; and if no ordered pair with item number i is in h, then array element i is set to a value of −1. Initially, all array elements are set to −1 and then operation sequence is processed. If insert (i,k) is executed then array element i is checked to see if it contains −1. (The value of −1 is an arbitrary selection meant to serve only as an indicator.) If array element i does contain −1, then it is set to k. If deletemin (h) is executed, then the answer indicated by the certification trail, say (i,k), is examined. Array element i is checked to see if it contains k. In addition, k is compared to the key value of previous element in the certification trail sequence to see if it is greater than or equal to that previous value. If both these checks succeed then array element i is set to −1.

If any of the checks just described above fails, then the execution halts and "error" is output. Otherwise the operation sequence is considered "verified". It can be rigorously shown that the checks described are sufficient for determining whether the answers given in the certification trail are correct; this proof, however, has been omitted for the sake of brevity. Finally, it is worth noting that to combine the two logical parts of this execution, one can perform the data structure checking in tandem with the code execution of HUFFMAN. Each time an insert or deletemin is encountered in the code, the appropriate set of checks are performed.

Time Complexity Comparison of the Two Executions

Again, as in the minimum spanning tree example, the availability of the certification trail permits the second execution for the Huffman tree problem to be dramatically more efficient than the first.

In the first execution of HUFFMAN, each data structure operation can be performed in $O(\log(n))$ time where n is the number of frequencies in the input. There are $O(n)$ such operations and $O(n)$ additional time overhead, hence, the execution can be performed in $O(n \log(n))$. This is the same complexity as the best known algorithm for constructing Huffman trees.

In the second code execution of HUFFMAN, each data structure operations is performed in constant time. Further, verifying the data structure operations are correct takes only a constant time per operation. Thus, it follows that the overall complexity of the second execution is only $O(n)$.

Convex Hull Example

The convex hull problem is fundamental in computational geometry. The certification trail solution to the generation of a convex hull is based on a solution due to Graham [Graham, R.L., "An efficient algorithm for determining the convex hull of a planar set", Information Processing Letters, pp. 132-133, 1 1972] which is called "Graham's Scan." (For basic definitions and concepts in computational geometry, see the text of Preparata and Shamos [Preparata F.P., and Shamos M.I., Computational geometry; an introduction, Springer-Verlag, New York, N.Y., 1985].) For simplicity in the discussion which follows, it is assumed the points are in so-called "general position" (this is, no three points are colinear). It is not difficult to remove this restriction.

Definition 3.4. A convex region in $R^2$ is a set of points, say Q, in $R^2$ such that for every pair of points in Q the line segment connecting the points lies entirely within Q. A polygon is a circularly ordered set of line segments such that each line segment shares one of its endpoints with the preceding line segment and shares the other endpoint with the succeeding line segment in the ordering. The shared endpoints are called the vertices of the polygon. A polygon may also be specified by an ordering of its vertices. A convex polygon is a polygon which is the boundary of some convex region. The convex hull of a set of points, S, in the Euclidean plane is defined as the smallest convex polygon enclosing all the points. This polygon is unique and its vertices are a subset of the points in S. It is specified by a counterclockwise sequence of its vertices.

Figures 8A, 8B, 8C:
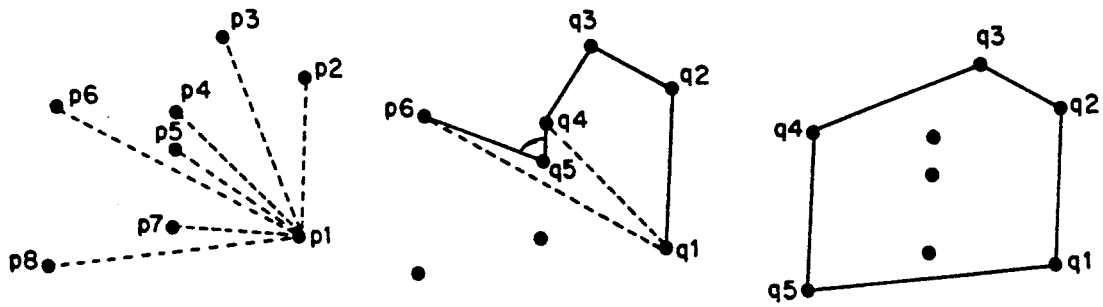
FIG. 8A through FIG. 8C shows a convex hull example.
Figure 9:
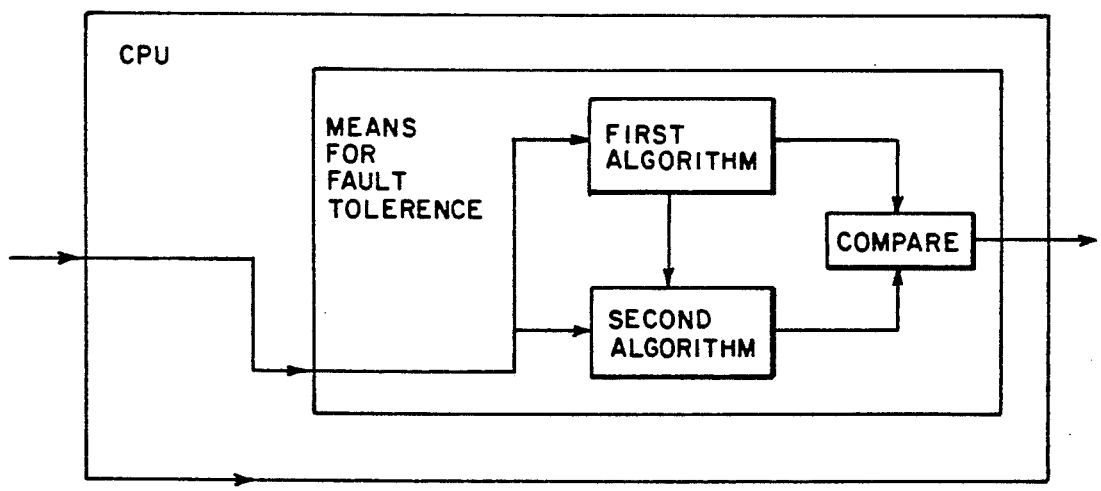
FIG. 9 is a block diagram of an apparatus of the present invention.
Figure 10:
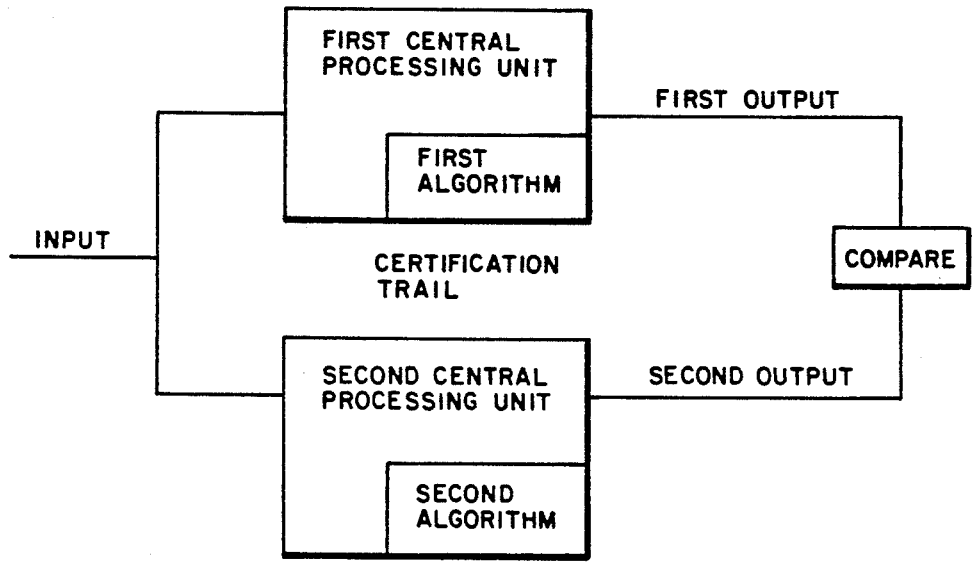
FIG. 10 is a block diagram of another embodiment of the present invention.
Figure 11:
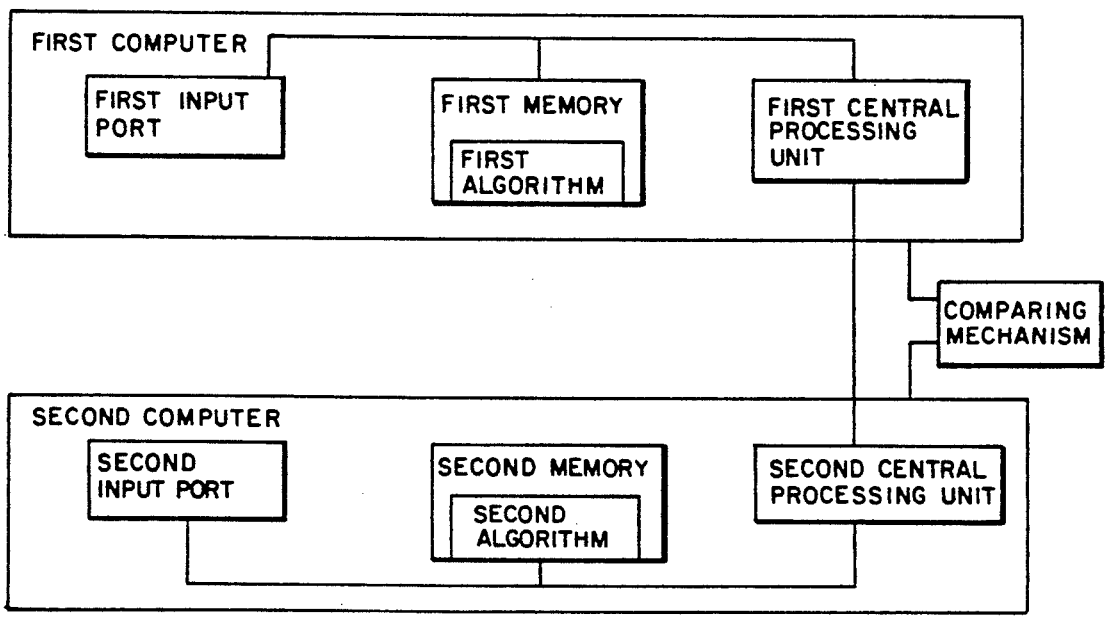
FIG. 11 is a block diagram of another embodiment of the present invention.

FIG. 8(c) shows a convex hull for the points indicated by black dots. Graham's can algorithm given below constructs the convex hull incrementally in a counterclockwise fashion. Sometimes it is necessary for the algorithm to "backup" the construction by throwing some vertices out and then continuing. The first step of the algorithm selects an "extreme" point and calls it $p_1$. The next two steps sort the remaining points in a way which is depicted in FIG. 8(a). It is not hard to show that after these three steps the points when taken in order, $p_1, p_2, \ldots, p_n$, form a simple polygon; although, in general, this polygon is not convex.

Graham's Scan Algorithm

It is possible to think of Graham's scan algorithm as removing points from this simple polygon until it becomes convex. the main FOR loop iteration adds vertices to the polygon under construction and the inner WHILE loop removes vertices from the construction. A point is removed when the angle test performed at Step 6 reveals that it is not on the convex hull because it falls within the triangle defined by three other points. A "snapshot" of the algorithm given in FIG. 8(b) shows that $q_5$ is removed from the hull. The angle formed by $q_4,q_5, p_6$ is less than 180 degrees. This means, $q_5$ lies within the triangle formed by $q_4, p_1, p_6$. (Note, $q_1 = p_1$.) In general, when the angle test is performed, if the angle formed by $q_{m-1},q_m,p_k$ is less than 180 degrees, then $q_m$ lies within the triangle formed by $q_{m-1},p_1,p_k$. Below it will be revealed that this is the primary information relied on in our certification trail. When the main FOR loop is complete, the convex hull has been constructed.

First Execution of Graham's Scan

In this execution the code CONVEXHULL is used. The certification trail is generated by adding an output statement within the WHILE loop. Specifically, if an angle of less than 180 degrees is found in the WHILE loop test then the four tuple consisting of $q_m,q_{m-1},p_1,p_k$ is output to the certification trail. Table 3 below shows the four tuples of points that would be output by the algorithm when run on the example in FIG. 8. The points in Table 3 are given the same names as in FIG. 8(a). The final convex hull points $q_1, \ldots q_m$ are also output to the certification trail. Strictly speaking the trail output does not consist of the actual points in $R^2$. Instead, it consists of indices to the original input data. This means if the original data consists of $s_1,s_2, \ldots, s_n$ then rather than output the element in $R^2$ corresponding to $s_i$ the number i is output. It is not hard to code the program so that this is done.

TABLE 3

| First part of certification trail for Graham's scan ||
|---|---|
| Point not on convex hull | Three surrounding points |
| $p_5$ | $p_4,p_1,p_6$ |
| $p_4$ | $p_3,p_1,p_6$ |
| $p_7$ | $p_6,p_1,p_8$ |

Second Execution for the Convex Hall Problem

Let the certification trail consist of a set of four tuples, $(x_1,a_1,b_1,c_1), (x_2,a_2,b_2,c_2), \ldots, (x_r,a_r,b_r,c_r)$ followed by the supposed convex hull, $q_1,q_2, \ldots ,q_m$. The code for CONVEXHULL is not used in this execution. Indeed, the algorithm performed is dramatically different than CONVEXHULL.

It consists of five checks on the trail data.

First, the algorithm checks for $i \in (1, \ldots ,r)$ that $x_i$ lies within the triangle defined by $a_i,b_i,$ and $c_i$.

Second, the algorithm checks that for each triple of counterclockwise consecutive points on the supposed convex hull the angle formed by the points is less than or equal to 180 degrees.

Third, it checks that there is a one to one correspondence between the input points and the points in $(x_1, \ldots ,x_r) \cup (q_1, \ldots ,q_m)$.

Fourth, it checks that for $i \in (1, \ldots ,r)$, $a_i,b_i,$ and $c_i$ are among the input points.

Fifth, it checks that there is a unique point among the points on the supposed convex hull which is a local extreme point. A point q on the hull is a local extreme point if its predecessor in the counterclockwise ordering has a strictly smaller y coordinate and its successor in the ordering has a smaller or equal y coordinate.

If any of these checks fail then execution halts and "error" is output. As mentioned above, the trail data actually consists of indices into the input data. this does not unduly complicate the checks above; instead it makes them easier. The correctness and adequacy of these checks must be proven.

Time Complexity of the Two Executions

In the first execution the sorting of the input points takes $O(nlog(n))$ time where n is the number of input points. One can show that this cost dominates and the overall complexity is $O(nlog(n))$.

It is possible to note that, unlike the minimum spanning tree example and the Huffman tree example, the convex hull example utilizes an algorithm in the second execution that is not a close variant of that used int he first execution. However, like the previous two examples, the second execution for the convex hull problem depends fundamentally on the information in the certification trail for efficiency and performance.

Concurrency of Executions

In the three examples discussed above, it is possible to start the second execution before the first execution has terminated. This is a highly desirable capability when additional hardware is available to run the second execution (for example, with multiprocessor machines, or machines with coprocessors or hardware monitors).

In the case of the minimum spanning tree problem, the two executions can be run concurrently. It is only necessary for the second execution to read the certification trail as it is generated—one item number at a time. Thus, there is a slight time lag in the second execution. The case of the Huffman tree problem is similar. Both executions can be run concurrently if the second execution reads the certification trail as it is generated by the first execution.

The case of the convex hull problem is not quite as favorable, but it is still possible to partially overlap the two executions. For example, as each 4-tuple of points is generated by the first execution, it can be checked by the second execution. But the second execution must wait for the points on the convex hull to be output at the end of the first execution before they can be checked.

An additional opportunity for overlapping execution occurs when the system has a dedicated comparator. In this case it is sometimes possible for the two executions to send their output to the comparator as they generate it. For example, this can be done in the minimum spanning tree problem where the edges of the tree can be sent individually as they are discovered by both executions.

Comparison of Techniques

The certification trail approach to fault tolerance, whether implemented in hardware or software or some combination thereof, has resemblances with other fault tolerant techniques that have been previously proposed and examined, but in each case there are significant and fundamental distinctions. These distinctions are primarily related to the generation and character of the certification trail and the manner in which the secondary algorithm or system uses the certification trail to indicate whether the execution of the primary system or algorithm was in error and/or to produce an output to be compared with that of the primary system.

To being, the certification trail approach might be viewed as a form of N-version programming [Chen, L., and Avizienis A., "N-version programming: a fault tolerant approach to reliability of software operation," Digest of the 1978 Fault Tolerant Computing Symposium, pp. 3–9, IEEE computer Society Press, 1978; Avizienis, A., and Kelly J., "Fault tolerance by design diversity: concepts and experiments," Computer, vol. 17, pp. 67–80. August, 1984]. This approach specifies that N different implementations of an algorithm be independently executed with subsequent comparison of the resulting N outputs. There is no relationship among the executions of the different versions of the algorithms other than they all use the same input; each algorithm is executed independently without any information about the execution of the other algorithms. In marked contrast, the certification trail approach allows the primary system to generate a trail of information while executing its algorithm that is critical to the secondary system's execution of its algorithm. In effect, N-version programming can be thought of relative to the certification trail approach as the employment of a null trail.

A software/hardware fault tolerance technique known as the recovery block approach [Randell, Ba., "System structure for software fault tolerance," IEEE Trans. on Software Engineering vol. 1, pp. 202–232, June, 1975; Anderson, T., and Lee, P., Fault tolerance: principles and practices, Prentice-Hall, Englewood Cliffs, N.J., 1981; Lee, Y. H. and Shin, K. G., "Design and evaluation of a fault-tolerant multiprocessor using hardware recovery blocks," IEEE Trans. Comput., vol C-33, pp. 113–124, February 1984.] uses acceptance tests and alternative procedures to produce what is to be regarded as a correct output from a program. When using recovery blocks, a program is viewed as being structured into blocks of operations which after execution yield outputs which can be tested in some informal sense for correctness. The rigor, completeness, and nature of the acceptance test is left to the program designer, and many of the acceptance tests that have been proposed for use tend to be somewhat straightforward [Anderson, T., and Lee, P., Fault tolerance: principles and practices, Prentice-Hall, Englewood Cliffs, N.J., 1981]. Indeed, formal methodologies for the definition and generation of acceptance tests have thus far not been established. Regardless, the certification trail notion of a secondary system that receives the same input as the primary system and executes an algorithm that takes advantage of this trail to efficiently produce the correct output and/or to indicate that the execution of the first algorithm was correct does not fall into the category of an acceptance test.

A watchdog processor is a small and simple (relative to the primary system being monitored) hardware monitor that detects errors examining information relative to the behavior of the primary system [Mahmood, A., and McCluskey, E., "Concurrent error detection using watchdog processors," IEEE Trans. on Computers, vol. 37, pp. 160–174, February, 1988; Mahmood, A., and McCluskey, E., "Concurrent error detection using watchdog processors—a survey," IEEE Trans. on Computers, vol. 37, pp. 160–174, February, 1988; Namjoo, M., and McCluskey, E., "Watchdog processors and capability checking," Digest of the 1982 Fault Tolerant Computing Symposium, pp. 245–248, IEEE Computer Society Press, 1982.]. Error detection using a watchdog processor is a two-phase process: in the set-up phase, information about system behavior is provided a priori to the watchdog processor about the system to be monitored; in the monitoring phase, the watchdog processor collects or is sent information about the operation of the system to be compared with that which was provided during the set-up phase. On the basis of this comparison, a decision is made by the watchdog processor as to whether or not an error has occurred. The information about system behavior by means of which a watchdog processor must monitor for errors includes memory access behavior [Namjoo, M., and McCluskey, E., "Watchdog processors and capability checking," Digest of the 1982 Fault Tolerant Computing Symposium, pp. 245–248, IEEE Computer Society Press, 1982], control and program flow [Eifert, J. B. and Shen, J. P., "Processor monitoring using asynchronous signatured instruction streams," Dig. 14th Int. Conf. Fault-Tolerant Comput., pp. 394–399, 1984, June 20–22; Iyengar, V. S. and Kinney, L. L., "Concurrent fault detection in microprogrammed control units," IEEE Trans. Comput., vol. C-34, pp. 810–821, September 1985; Kane, J. R. and Yau, S. S., "Concurrent software fault detection, " IEEE Trans. Software Eng., vol. SE-1, pp. 87–99, March 1975; Lu, D., "Watchdog processor and structural integrity checking, " IEEE Trans. Comput., vol. C-31, pp. 681–685, July 1982; Namjoo, M., "Techniques for concurrent testing of VLSI processor operation," Dig. 1982 Int. Test Conf., pp. 461–468, November 1982; Namjoo, M., "CERBERUS-16: An architecture for a general purpose watchdog processor," Dig. Papers 13th Annu. Int. Sump. Fault Tolerant Comput., pp. 216–219, June, 1983; Shen, J. P. and Schuette, M.A., "On-line self-monitoring using signatured instruction streams," Proc. 1983 Int. Test Conf., pp. 275–282, October, 1983; Sridhar, T. and Thatte, S. M., "Concurrent checking of program flow in VLSI processors," Dig. 1982 Int. Test Conf., pp. 191–199, November, 1982; 46,47], or reasonableness of results [Mahmood, A., Lu, D. J. and McCluskey, E. J., "Concurrent fault detection using a watchdog processor and assertions," Proc. 1983 Int. Test Conf., pp. 622–628, October, 1983; Mahmood, A. Ersoz, a. and McCluskey, E.J., "concurrent system level error detection using a watchdog processor," Proc. 1985 Int. Test conf., pp. 145–152, November, 1985]. Using physical fault injection techniques, distributions of errors that could be detected using such types of information have been determined for some specific systems [Schmid, M., Trapp, R., Davidoff, A., and Masson, G., "Upset exposure by means of abstraction verification," Dig. of the 1982 Fault Tolerant Computing Symposium, pp. 237–244, June, 1982; Gunneflo, U., Karlsson, J., and Torin, J., "Evaluation of error detection schemes for using fault injection by heavy-ion radiation," Dig. of the 1989 Fault Tolerant Computing Symposium, pp. 340–347, June, 1989], and the performance of models of error monitoring techniques that could be realized in the form of watchdog processors have been analyzed [Blough, D., and Masson, G., "Performance analysis of a generalized concurrent error detection procedure," IEEE Trans. on Computers vol. 39, January, 1990.]. However, in contrast to the certification trail technique, a watchdog processor uses only a priori defined behavior checks, none of which is sufficient together with the input to the primary system to efficiently reproduce the output for direct comparison with that of the primary system.

Related to the watchdog processor approach is that of using executable assertions [Andrews, D., "Software fault tolerance through executable assertions," Rec. 12th Asilomar Conf. Circuits, Syst., Comput., pp. 641–645, 1978, November 6–8; Andrews, D., "Using executable assertions for testing and fault tolerance," Dig. 9th Annu. Int. Sump. Fault-Tolerant Comput., pp. 102-105, 1979, June 20-22; Mahwood, A., Lu, D. J. and McCluskey E. J., "Concurrent fault detection using a watchdog processor and assertions," Proc. 1983 Int. Test Conf., pp. 622-628, October 1983]. An assertion can be defined as an invariant relationship among variables of a process. In a program, for examples, assertions can be written as logical statements and can be inserted into the code to signify that which has been predetermined to be invariably true at that point in the execution of the program. Assertions are based on a priori determined properties of the primary system or algorithm. This, however, again serves to distinguish executable assertion technique from the use of certification trails in that a certification trail is a key to the solution of a problem or the execution of an algorithm that can be utilized to efficiently and correctly produce the solution.

Algorithm-based fault tolerance [Huang, K.-H., and Abraham, J., "Algorithm-based fault tolerance for matrix operations," IEEE Trans. on Computers, pp. 518-529, vol. C-33, June, 1984; Nair, V., and Abraham, J., "General linear codes for fault-tolerant matrix operations on processor arrays," Dig. of the 1988 Fault Tolerant Computing Symposium, pp. 180-185, June, 1988; "Fault tolerant FTT networks," Dig. of the 1985 Fault Tolerant Computing Symposium, June, 1985] uses error detecting and correcting codes for performing reliable computations with specific algorithms. This technique encodes data at a high level and algorithms are specifically designed or modified to operate on encoded data and produce encoded output data. Algorithm-based fault tolerance is distinguished from other fault tolerance techniques by three characteristics: the encoding of the data used by the algorithm; the modification of the algorithm to operate on the encoded data; and the distribution of the computation steps in the algorithm among computational units. It is assumed that at most one computational unit is faulty during a specified time period. The error detection capabilities of the algorithm-based fault tolerance approach are directly related to that of the error correction encoding utilized. The certification trail approach does not require that the data to be executed be modified nor that the fundamental operations of the algorithm be changed to account for these modifications. Instead, only a trail indicative of aspects of the algorithm's operations must be generated by the algorithm. As seen from the above examples, the production of this trail does not burden the algorithm with a significant overhead. Moreover, any combination of computational errors can be handled.

Recently Blum and Kannan [Blum, M., and Kannan, S., "Designing programs that check their work," Proceedings of the 1989 ACM Symposium on Theory of Computing, pp. 86-97, ACM Press, 1989] have defined what they call a program checker. A program checker is an algorithm which checks the output of an other algorithm for correctness and thus it is similar to an acceptance test in a recovery block. An example of a program checker is the algorithm developed by Tarjan [Tarjan, R. E., "Applications of path compression on balanced trees," J. ACM, pp. 690-715, October, 1979] which takes as input a graph and a supposed minimum spanning tree and indicates whether or not the tree actually is a minimum spanning tree. The Blum and Kannan checker is actually more general than this because it is allowed to be probabilistic in a carefully specified way. There are two main differences between this approach and the certification trail approach. First, a program checker may call the algorithm it is checking a polynomial number of times. In the certification trail approach the algorithm being checked is run once. Second, the checker is designed to work for a problem and not a specific algorithm. That is, the checker design is based on the input/output specification of a problem. The certification trail approach is explicitly algorithm being checked is run once. Second, the checker is designed to work for a problem and not a specific algorithm. That is, the checker design is based on the input/output specification of a problem. The certification trail approach is explicitly algorithm oriented. In other words, a specific algorithm for a problem is modified to out put a certifications trail. This trail sometimes allows the second execution to be faster than any known program checkers for the problem. This is the case for the minimum spanning tree problem.

Other hardware and software fault tolerance and error monitoring techniques have been proposed and studied that might be thought of as bearing some resemblance to the certification trail approach. Extensive summaries and descriptions of these techniques can be found in the literature [Siewiorek, D., and Swarz, R., The theory and practice of reliable design, Digital Press, Bedford, Mass., 1982; Avizienis, A., "Fault tolerance by means of external monitoring of computer systems," Proceedings of the 1981 National Computer Conference, pp. 27-40, AFIPS Press, 1980; Johnson, B., Design and analysis of fault tolerant digital systems, Addison-Wesley, Reading, Mass., 1989; Mahmood, A., and McCluskey, E., "Concurrent error detection using watchdog processors—a survey," IEEE Trans. on Computers, vol. 37, pp. 160-174, February, 1988]. Examination of these techniques reveals, however, that in each case there are fundamental distinctions from the certification trail approach. In summary, the certification trail approach stands along in its employment of secondary algorithms/systems for the computation of an output for comparison that because of the availability of the trail not only proceeds in a more efficient manner than that of the primary but also can indicate whether the execution of the primary algorithm was correct.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for achieving fault tolerance in a computer system having at least a first central processing unit and a second central processing unit comprising the steps of:

executing a first algorithm in the first central processing unit on input so that a first output and a certification trail are produced;

executing a second algorithm in the second central processing unit on the input and on the certification trail so that a second output is produced, said second algorithm having a faster execution time than the first algorithm for a given input; and comparing the first and second outputs such that an error result is produced if the first and second outputs are not the same.

2. A method as described in claim 1 wherein the step of executing the second algorithm includes the step of determining whether the certification trail is in error.

3. A method as described in claim 2 including before the step of executing the first algorithm, there is the step of duplicating the input such that the input that is provided to the step of executing the first algorithm is also the input that is provided to the step of executing the second algorithm.

4. A method as described in claim 3 wherein the step of executing the first algorithm includes the step of determining whether the first output is in error.

5. A method as described in claim 4 wherein the step of executing the first algorithm includes the step of determining whether the second output is in error.

6. A method as described in claim 5 wherein the second algorithm generates the second output correctly when the second algorithm is executed by the second processing unit even if the certification trial produced by the first algorithm when the first algorithm is executed by the first processing unit is incorrect.

7. A method as described in claim 1 wherein the second algorithm is derived from the first algorithm.

8. A computer system comprising:
a first computer comprising:
a first memory,
a first central processing unit in communication with the memory,
a first input port in communication with the memory and the first central processing unit,
a first algorithm disposed in the first memory, said first algorithm produces a first output and produces a certification trail based on input received by the input port when the first algorithm is executed by the first central processor;
a second computer comprising a second memory,
a second central processing unit in communication with the second memory and the first central processing unit;
a second input port in communication with the second memory and the second central processing unit;
a second algorithm disposed in the second memory, said second algorithm produces a second output based on the input and the certification trail when the second algorithm is executed by the second central processing unit, said second algorithm having a faster execution time than the first algorithm for a given input; and
a mechanism for comparing the first and second outputs such that an error result is produced if the first and second outputs are not the same.

9. A computer as described in claim 8 wherein the second algorithm generates the second output correctly when the second algorithm is executed by the second processing unit even if the certification trail produced by the first algorithm when the first algorithm is executed by the first processing unit is incorrect.

10. A computer system as described in claim 9 wherein the mechanism for comparing is a comparator.

11. An apparatus as described in claim 10 wherein the second algorithm is derived from the first algorithm.

12. A method for achieving fault tolerance in a central processing unit comprising the steps of:
executing a first algorithm in the central processing unit on input so that a first output and a certification trail are produced;
executing a second algorithm in the central processing unit on the input and on the certification trail so that a second output is produced, said second algorithm having a faster execution time than the first algorithm for a given input; and
comparing the first and second outputs such that an error result is produced if the first and second outputs are not the same.

13. A method as described in claim 12 wherein the second algorithm generates the second output correctly when the second algorithm is executed by the processing unit even if the certification trail produced by the first algorithm when it is executed by the processing unit is incorrect.

14. A method as described in claim 13 wherein the second algorithm is derived from the first algorithm.

15. A computer comprising:
a memory,
a central processing unit in communication with the memory,
a first input port in communication with the memory and the central processing unit,
a first algorithm disposed in the memory, said first algorithm produces a first output and a certification trail based on input received by the input port when the input is executed by the central processing unit;
a second algorithm disposed in the memory, said second algorithm produces a second output based on the input and on at least a portion of the certification trail when the second algorithm is executed by the central processing unit, said second algorithm having a faster execution time than the first algorithm for a given input; and
a mechanism for comparing the first and second outputs such that an error result is produced if the first and second outputs are not the same.

16. A computer as described in claim 15 wherein the second algorithm generates the second output correctly when the second algorithm is executed by the processing unit even if the certification trail produced by the first algorithm when the first algorithm is executed by the processing unit is incorrect.

17. A computer as described in claim 16 wherein the mechanism for comparing is a comparator.

18. An apparatus as described in claim 15 wherein the second algorithm is derived from the first algorithm.

* * * * *